(12) United States Patent
Nakakado

(10) Patent No.: US 6,758,109 B2
(45) Date of Patent: Jul. 6, 2004

(54) CAM DEVICE

(75) Inventor: Masaki Nakakado, Hirakata Osaka (JP)

(73) Assignee: Zuiko Corporation, Osaka (JP)

( * ) Notice: Subject to any disclaimer, the term of this patent is extended or adjusted under 35 U.S.C. 154(b) by 12 days.

(21) Appl. No.: 09/999,867

(22) Filed: Oct. 23, 2001

(65) Prior Publication Data

US 2002/0092371 A1 Jul. 18, 2002

(30) Foreign Application Priority Data

Oct. 27, 2000 (JP) ........................................ 2000-328920

(51) Int. Cl.$^7$ .......................... F16H 53/06; F16H 25/10; F16H 25/12; B65G 47/86
(52) U.S. Cl. ............................................. 74/57; 74/569
(58) Field of Search ................................ 74/55, 56, 57, 74/569, 58; 198/377.08, 377.04, 377.01, 471.1, 399, 676, 395, 394, 465.2, 377.06; 271/182, 183, 20, 81–82; 156/157, 505, 506; 123/56.8, 90.5; 101/410; 242/533.4; 414/811, 404, 763, 744.7

(56) References Cited

U.S. PATENT DOCUMENTS

| | | | | |
|---|---|---|---|---|
| 3,883,016 A | * | 5/1975 | Simpatico | 414/811 |
| 4,069,724 A | * | 1/1978 | Sobotta | 74/569 |
| 4,186,542 A | * | 2/1980 | Oyagi | 53/88 |
| 4,415,126 A | * | 11/1983 | Nakazawa et al. | 242/477.3 |
| 4,836,040 A | * | 6/1989 | Brems | 74/63 |
| 5,025,910 A | | 6/1991 | Lasure et al. | |
| 5,040,426 A | * | 8/1991 | Wueller | 74/56 |
| 5,353,909 A | * | 10/1994 | Mukai et al. | |
| 5,556,504 A | | 9/1996 | Rajala et al. | |
| 5,899,404 A | * | 5/1999 | McNeil et al. | 242/533.4 |
| 5,913,490 A | * | 6/1999 | McNeil et al. | 242/533.4 |
| 6,073,503 A | * | 6/2000 | Matsuno et al. | 74/569 |
| 6,390,804 B1 | * | 5/2002 | Akino et al. | 425/556 |
| 2002/0125105 A1 | * | 9/2002 | Nakakado | 198/471.1 |
| 2003/0034226 A1 | * | 2/2003 | Kato | 198/465.2 |

FOREIGN PATENT DOCUMENTS

| | | |
|---|---|---|
| CH | 415 399 | 6/1966 |
| EP | 1 062 929 A1 | 12/2000 |
| EP | 001209381 A2 * | 5/2002 |
| JP | 58 037364 A | 3/1983 |
| JP | 60 044655 A | 3/1985 |
| JP | 63-317576 | 12/1988 |
| JP | 01-272803 | 10/1989 |
| JP | 03 199748 A | 8/1991 |
| JP | 2000 337469 A | 12/2000 |

OTHER PUBLICATIONS

Translations of JP 3–199748, CH 415399, JP 6–44655, JP 58–037364 and JP 2000–337469.*
European Search Report (2 pgs).

* cited by examiner

Primary Examiner—Douglas C. Butler
(74) Attorney, Agent, or Firm—Eschweiler & Associates, LLC

(57) ABSTRACT

The cam device of the invention includes individually rotatable first and second cam followers performing predetermined movement along a groove defined by first and second sidewalls. The cam followers are positioned so that their axes extend in the same direction. Movement of the first cam follower is restricted by at least part of the first sidewall, and movement of the second cam follower is restricted by at least part of the second sidewall.

24 Claims, 6 Drawing Sheets

CAM DEVICE

FIELD OF THE INVENTION

The present invention relates to a cam device (for example, a positive cam) including a rotatable cam follower (for example, a roller) moving along a groove.

BACKGROUND OF THE INVENTION

U.S. Pat. No. 6,073,503 discloses a cam device comprising a cam, a follower and elastic member for causing the follower to follow the cam. This type of cam is not suitable for high-speed movement.

FIG. 6 shows a positive cam of the type described above. As shown in FIG. 6, a cam follower 200 tends to be rotated in opposite directions when it is in contact with a first sidewall 101 of a cam groove 100 and when it is in contact with a second sidewall 102 thereof. To state more specifically, when the cam follower 200 moves relatively in the direction shown by arrow X along the cam groove 100, at a first position P1, the cam follower 200 moves forward while rotating clockwise keeping contact with the first sidewall 101. At a second position P2, however, the cam follower 200 moves forward while rotating counterclockwise keeping contact with the second sidewall 102.

Since the direction of the rotation of the cam follower 200 is reversed during the movement from the first position P1 to the second position P2, the cam follower 200 experiences sliding contact without rolling during this movement. The degree of friction due to sliding contact is markedly great compared with that due to rolling contact, and this sliding friction is noticeable when the cam follower moves at high speed.

An object of the present invention is to provide a cam device superior in durability with reduced friction.

SUMMARY OF THE INVENTION

In a first aspect of the present invention, in a cam device including a rotatable cam follower performing predetermined movement along a groove defined by first and second sidewalls, the cam follower includes individually rotatable first and second cam followers, and these cam followers are placed so that their axes extend in the same direction. Movement of the first cam follower is restricted by at least part of the first sidewall, and movement of the second cam follower is restricted by at least part of the second sidewall.

In a second aspect of the present invention, in a cam device including a rotatable cam follower performing predetermined movement along a groove defined by first and second sidewalls, the cam follower includes individually rotatable first and second cam followers, and these cam followers are placed so that their axes extend in the same direction. The first sidewall has a portion protruding toward the center of the groove, and the second sidewall has a portion protruding toward the center of the groove.

According to the first and second aspects of the present invention, the first cam follower is in contact with the first sidewall. Therefore, theoretically, the rotation direction of the first cam follower is prevented from changing even when the orientation of the cam changes in direction. Likewise, since the second cam follower is in contact with the second sidewall, the rotation direction of the second cam follower is theoretically prevented from changing even when the orientation of the cam changes in direction.

The first cam follower may come into contact with the second sidewall, or vice versa, for a brief period of time due to a disturbance (for example, due to an attaching of foreign matter and dirt). In such a case, however, since the first cam follower is prevented from rotating in reverse, the wear is small and thus the life of the cam device is prolonged.

According to another aspect of the present invention, the two cam followers are placed in one groove. Preferably, at least one of the sidewalls of the groove includes a lower sidewall face and an upper sidewall face, and these sidewall faces are displaced from each other with respect to the center of the groove.

Preferably, the two cam followers share the same rotation axis, that is, they are placed or situated coaxially. As the construction enabling the two cam followers to rotate individually, the first cam follower and/or the second cam follower preferably have a ball bearing or a roller bearing.

The first and second cam followers may be the same or different in thickness. In particular, one of the cam followers that wears more easily may be made thicker than the other cam follower. Alternatively, one of the cam followers that wears more easily may be made of a material more rigid (for example, higher in wear resistance) than the other cam follower. Otherwise, the wear of the two cam followers may be made uniform by performing a surface treatment, and such uniformity ensures constant outer-diameters of the first and second cam followers.

The first and/or second cam followers may have a barrel-shaped circumference.

Examples of the positive cam to which one of the present invention is applicable include cylindrical cams, columnar cams, conical cams, spherical cams, and face cams.

DESCRIPTION OF PREFERRED EMBODIMENTS

Figure 1A:
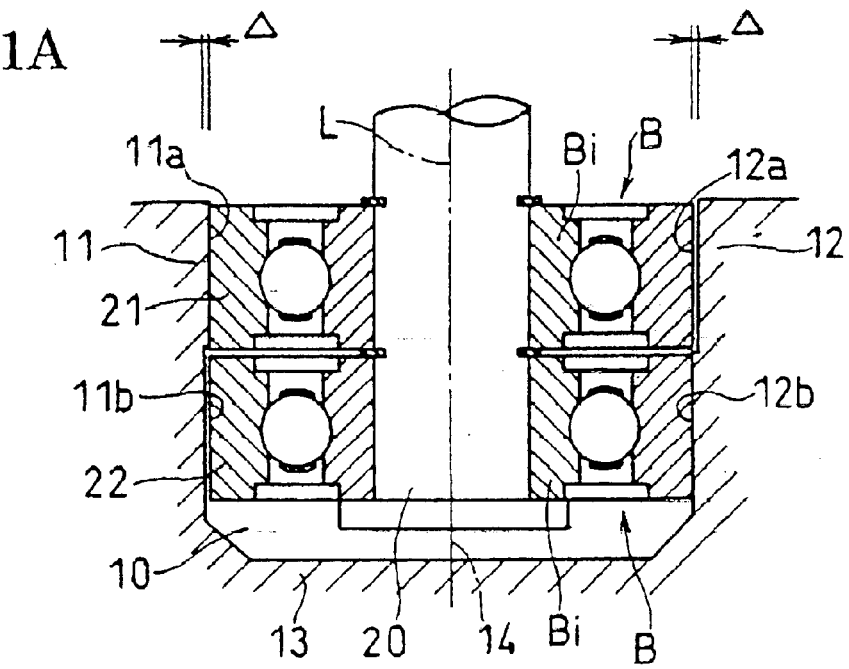
FIGS. 1A, 1B, and 1C are cross-sectional views of cam devices of an embodiment of the present invention.

The present invention will be more clearly understood by reading the following description of a preferred embodiment in conjunction with the accompanying drawings. It should be understood, however, that the embodiment disclosed herein in conjunction with the drawings is presented merely for illustration and description of the invention, and that the present invention is only restricted by the appended claims. In the accompanying drawings, the same or like components are denoted by the same reference numerals throughout the drawings.

Hereinafter, the embodiment of the present invention will be described with reference to the relevant drawings.

FIG. 1A shows a cam device in accordance with one exemplary aspect of the present invention. The cam device includes first and second cam followers 21 and 22, which perform a predetermined movement while rotating along one endless cam groove 10 in a curved surface as in a cylindrical cam 1 shown in FIG. 2.

Referring to FIG. 1A, the first and second cam followers 21 and 22 are attached to an end portion of a shaft 20 to be individually rotatable, and placed in the cam groove 10. Each of the cam followers 21 and 22 includes, for example, an outer race of a ball bearing B where an inner race of the ball bearing B is secured to the outer circumference of the end portion of the shaft 20. The cam followers 21 and 22 are placed so that they have the same axis L as their rotation center. That is, they are placed or situated coaxially.

Figure 2:
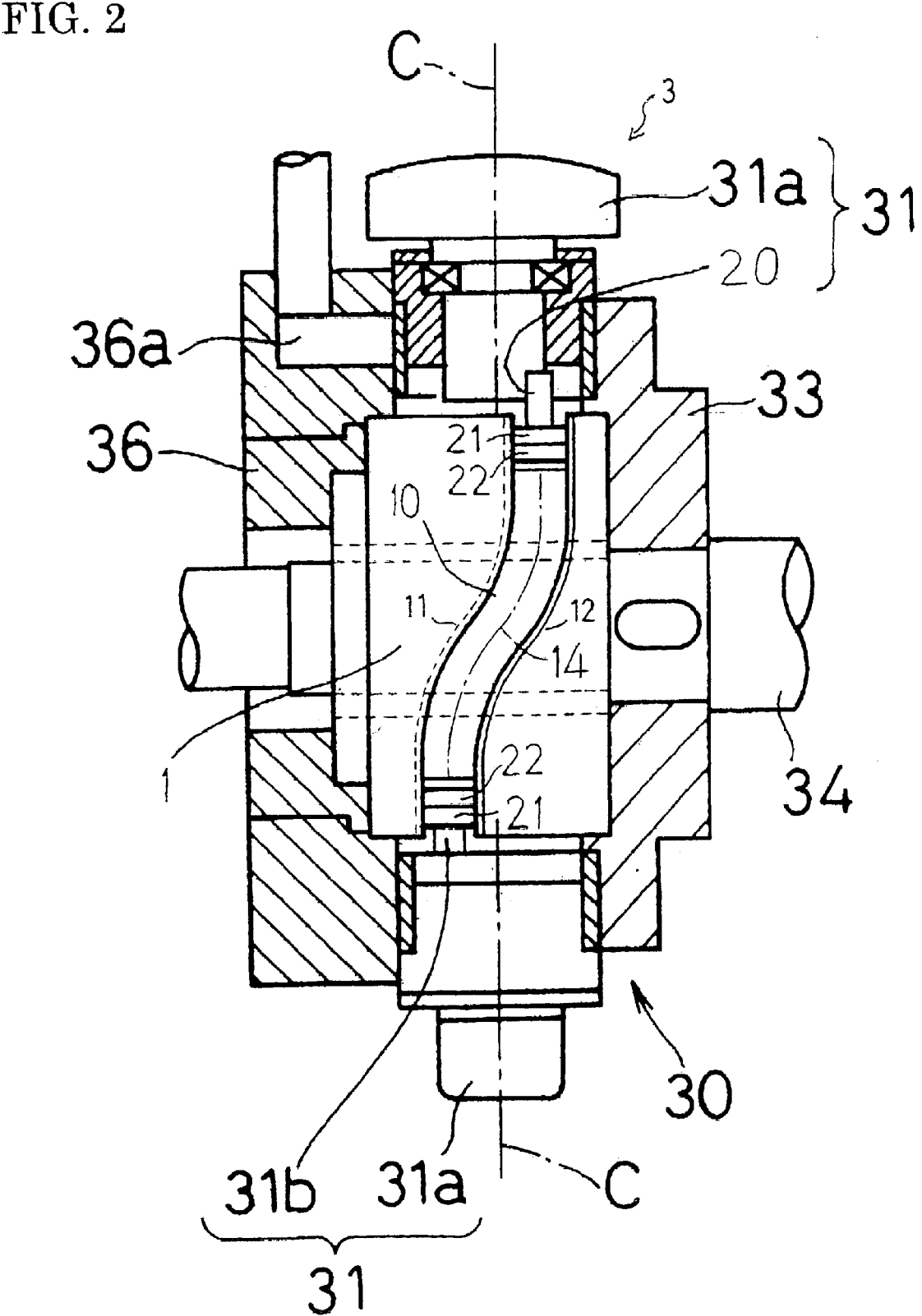
FIG. 2 is a vertical cross-sectional view of a turning apparatus.

The cam groove 10 includes first and second sidewalls 11 and 12 and a bottom wall 13, as components of the cylindrical cam 1 (FIG. 2). The first sidewall 11 includes a first upper sidewall face 11a and a first lower sidewall face 11b, and the second sidewall 12 has a second upper sidewall face 12a and a second lower sidewall face 12b. The "upper" and "lower" sidewall faces as used herein refer to upper and lower parts of each sidewall, respectively, when the bottom wall 13 of the cam groove 10 is in the bottom position.

The first and second upper sidewall faces 11a and 12a may face each other, and the first and second lower sidewall faces 11b and 12b may face each other, respectively. The first upper and lower sidewall faces 11a and 11b of the first sidewall 11 are displaced from each other with respect to a centerline 14 of the cam groove 10, as illustrated in greater detail in FIGS. 1B and 1C. The first upper sidewall face 11a protrudes toward the centerline 14 by an amount Δ from the first lower sidewall face 11b, as illustrated in FIG. 1A. The second upper and lower sidewall faces 12a and 12b of the second sidewall 12 are displaced from each other with respect to the centerline 14 of the cam groove 10. The second lower sidewall face 12b protrudes toward the centerline 14 by the amount Δ from the second upper sidewall face 12a.

The first cam follower 21 is placed between the first and second upper sidewall faces 11a and 12a, while the second cam follower 22 is placed between the first and second lower sidewall faces 11b and 12b.

By setting the positions of the first and second cam followers 21 and 22 and the shape of the cam groove 10 as described above, the first and second cam followers 21 and 22 are in contact with the first upper sidewall face 11a and the second lower sidewall face 12b, respectively. In other words, when one cam follower 21 (22) is regulated by one sidewall 11 (12), the other cam follower 22 (21) is placed to be kept from contact with the sidewall 11 (12). Thus, each of the cam followers 21 and 22 is placed to be in contact with only one sidewall 11 or 12.

Figure 1B:
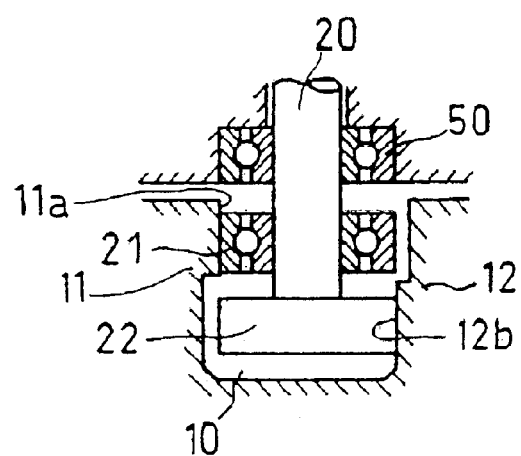
Figure 1C:
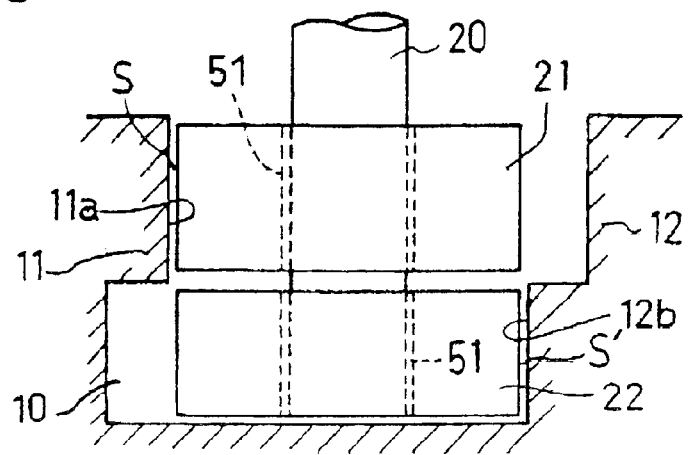

FIGS. 1B and 1C show modified cam followers of this embodiment.

Referring to FIG. 1B, one cam follower 22 is allowed to rotate integrally with the shaft 20 as long as the shaft 20 is supported rotatably with a bearing 50 or the like.

Referring to FIG. 1C, first and second cam followers 21 and 22 may be rotatably attached to the shaft 20 via a metal bearing 51 or the like. Also, a minute gap S may be provided between the first sidewall 11 and the first cam follower 21 and a minute gap S' may be provided between the second sidewall 12 and the second cam follower 22. In other words, the two cam followers 21 and 22 may not be in contact with any of the sidewalls 11 and 12. This state may cause slide to some extent, but will not cause reverse rotation of the cam follower 21 (22).

Next, an example of use of the cam device described above will be described. FIG. 2 shows a turning apparatus (direction change apparatus) 3 using the cam device in accordance with one aspect of the present invention.

The turning apparatus 3 can change the direction (position) of objects such as materials (components), semimanufactures, final products, and the like of disposable wear goods such as paper diapers in a manufacturing facility for such is wear goods, for example.

Figure 3:
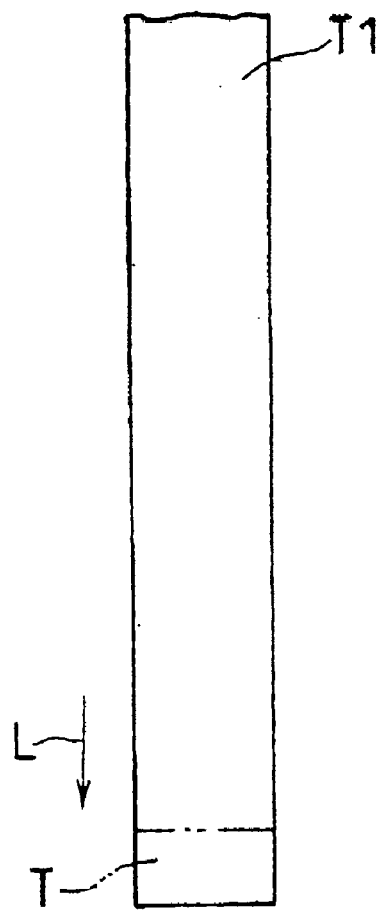
FIG. 3 is a schematic illustration on how an object is turned.
Figure 3:
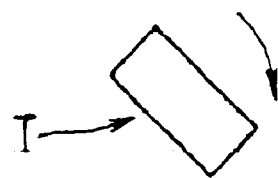
Figure 3:
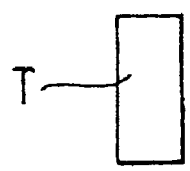

The above turning apparatus 3 can be used, for example, for turning an object T shown in FIG. 3, which is obtained by cutting an end portion of a web strip T1 along a two-dot chain line, by 90° while the object is being carried at high speed.

Figure 4:
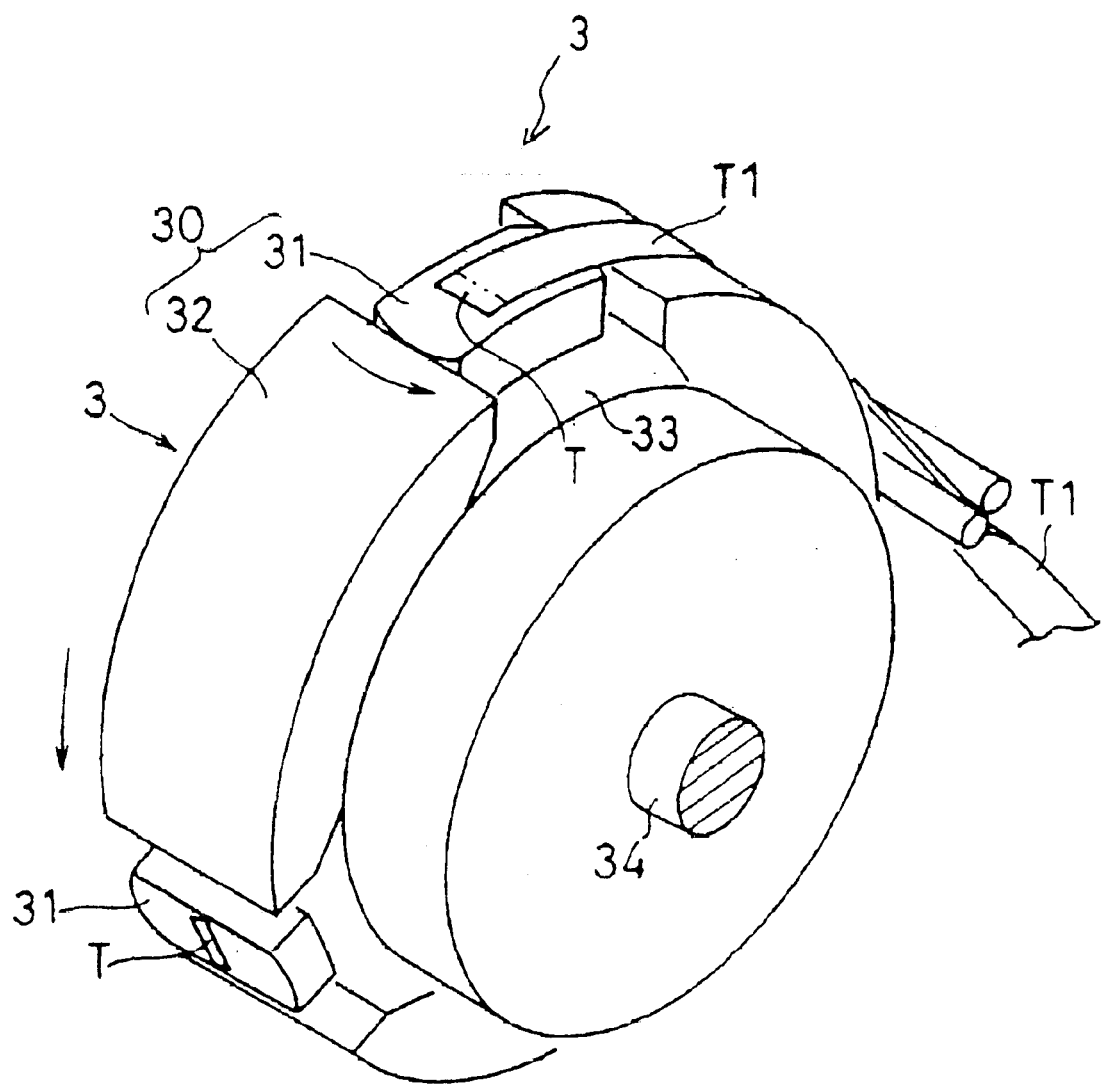
FIG. 4 is a schematic perspective view of the turning apparatus.

FIG. 4 is a perspective view of the turning apparatus 3. A plurality of blocks 31 are placed on the circumference of a rotating drum 33 so as to be turnable around the normal axis C (FIG. 2) to the drum 33. The object T lying on any of the blocks 31 can be turned when the drum 33 is rotated. The cam device of this example performs predetermined movement, in which the cam followers 21 and 22 rotate along the sidewalls 11 and 12 of the endless cam groove 10 formed on the cylindrical cam 1 shown in FIG. 2.

An exemplary detailed structure of the turning apparatus 3 will be described.

Figure 5:
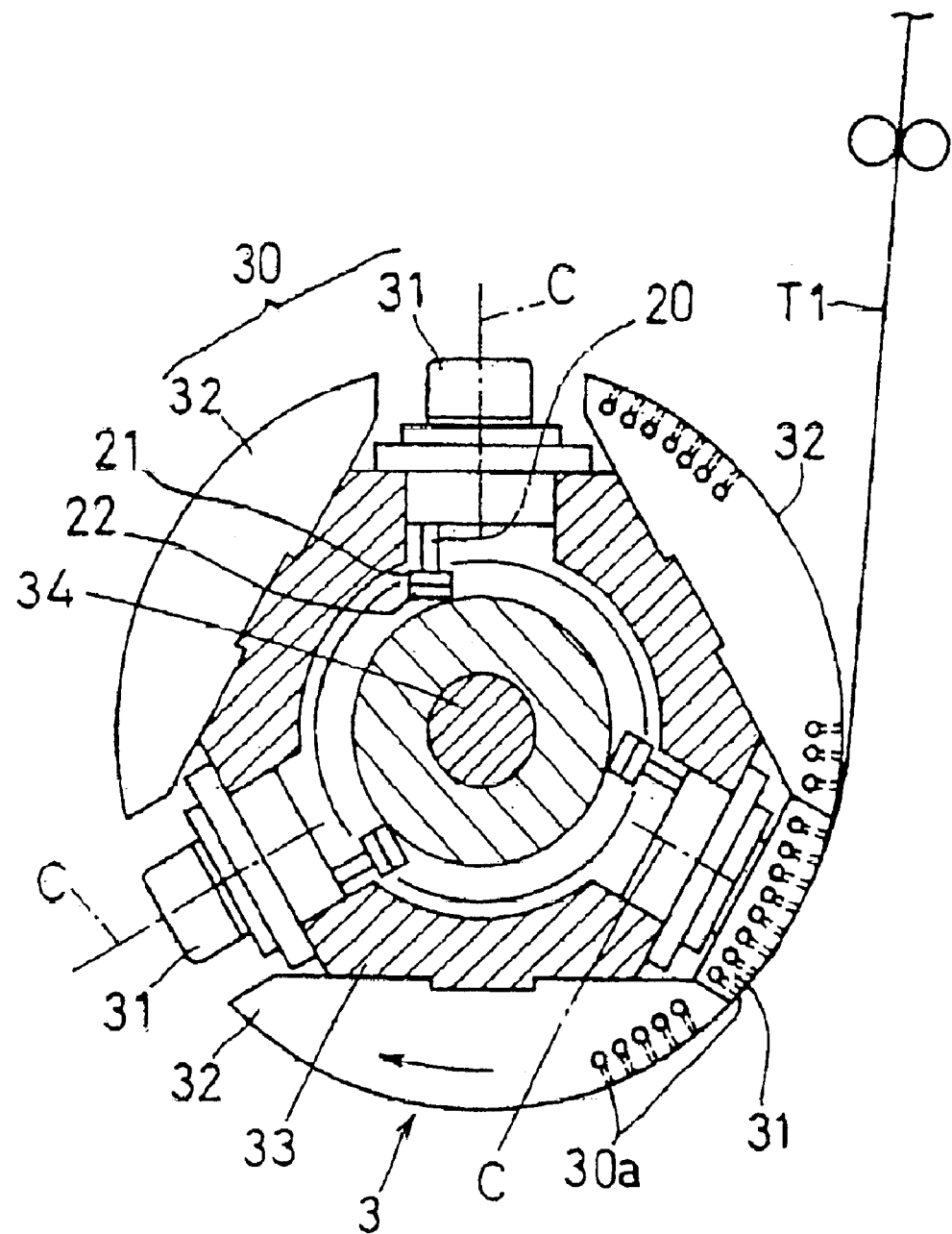
FIG. 5 is a schematic cross-sectional view of the turning apparatus.
Figure 6:
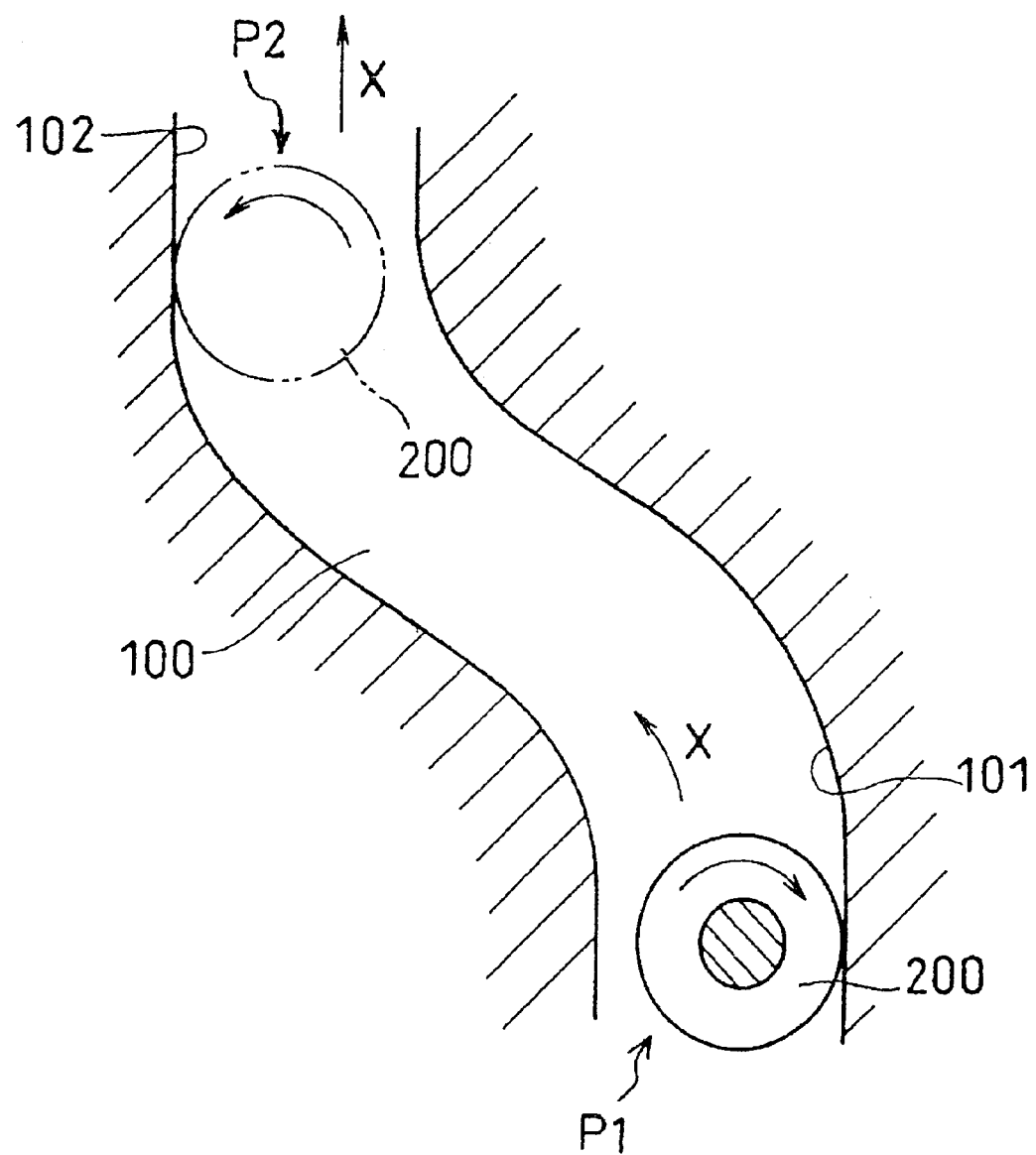
FIG. 6 is a plan view of a cam device.

FIG. 5 is a cross-sectional view of the turning apparatus 3. A suction roller 30 that rotates at a predetermined circumferential velocity comprises: the plurality of first suction blocks 31 turnable around the normal C to the suction roller 30; and a plurality of non-turnable second suction blocks 32. The suction roller 30 draws the web strip T1 thereto so that an end portion of the web strip T1 sticks to any of the first suction blocks 31. The first and second suction blocks 31 and 32 have a number of nozzles 30a for suction of the web strip T1. In FIG. 5, the nozzles 30a are shown only partly for simplification. The end portion of the web strip T1 is cut off from the remaining portion on the first suction block 31 with a cutter (not shown).

After the cutting of the web strip T1 the turning apparatus 3 turns the first suction block 31 around the normal axis C by 90 degrees to thereby turn the position of the object T by 90 degrees. The object T on the first suction block 31 is then carried to another apparatus.

The angle by which the object T is turned can also be set at 45 degrees or 60 degrees. This is done by changing the shape of the cam for turning the first suction block 31.

As shown in FIG. 5, the turning apparatus 3 includes the first suction blocks 31 and the second suction blocks 32 formed on the outer circumference of the drum 33. The second suction blocks 32 are secured to the drum 33, and the drum 33 rotates integrally with a rotation axis 34.

Referring to FIG. 2, the cylindrical cam 1 is placed around the outer circumference of the rotation axis 34, that is, located on the inner side of the blocks 31, in a non-rotatable manner. The cylindrical cam 1 is secured to a frame (not shown) via a fixed disk 36. The cylindrical cam 1 has the cam groove 10. A suction hole 36a associating with the nozzles 30a (FIG. 5) is formed to extend through the fixed disk 36.

Each of the first suction blocks 31 includes the cam followers 21 and 22 via the shaft 20 on the inner circumference of a block body 31a. The block body 31a is attached to the drum 33 and the fixed disk 36 so as to be rotatable around the normal axis C. The shaft 20, which is eccentric with respect to the block body 31a, moves circumferentially along the cam groove 10. By this movement of the shaft 20, the first suction block 31 turns by 90 degrees around the normal C as shown in FIG. 4 and then turns in the opposite direction by 90 degrees to resume the original position during the time period when the suction roller 30 rotates once.

With the above construction, the first suction block 31 (follower) provided with the cam followers 21 and 22 rotates in a predetermined direction around the cylindrical cam (driver) provided with the cam groove 10. During this rotation, the cam followers 21 and 22 shown in FIG. 1A rotate in a predetermined direction while being in contact with only one of the sidewalls 11a and 12b, respectively. This significantly reduces wear due to sliding contact.

Furthermore, the cam device described above may be included in a transfer apparatus described in U.S. application Ser. No. 09/889,275, which is hereby incorporated by reference in its entirety. The transfer apparatus can change transfer velocity of blocks to change a space between adjacent blocks.

The "driver" as used herein refers to an element (cam) provided with a predetermined cam curve in the form of a groove, and the "follower" refers to an element that performs a complicated movement via the cam followers.

Thus, an exemplary aspect of the present invention was described with reference to the accompanying drawings. It is believed clear to those skilled in the art that changes and modifications of the present invention are possible in light of the above teaching and known techniques.

For example, the cam device of the present invention is also applicable to apparatuses other than the turning apparatus described above. Also, the cam device of the present invention can be applied to a manufacturing machine for products other than wear goods, and even equipment and machines other than a manufacturing machine. The two cam followers alternatively may not have the same axis, but may be placed or situated to have axes in parallel with each other.

Such changes and modifications are therefore construed to fall within the scope of the present invention as defined by the appended claims.

Thus, according to the present invention, a pair of individually rotatable cam followers are provided. The cam followers are placed so that their axes are the same or in parallel with each other and that when one of the cam followers is in contact with one of sidewalls of a cam groove, the other cam follower is kept from contact with the sidewall. That is, each of the cam followers is in contact with only one sidewall. Therefore, theoretically, the direction of the rotation of each cam follower is kept unchanged. This significantly reduces slide friction of the cam followers, and thus improves the durability.

What is claimed is:

1. A cam device, comprising:
   a surface of the cam device configured to define a curved cam groove associated therewith, wherein the cam groove is generally defined by a first sidewall, an oppositely-disposed second sidewall, and a bottom wall;
   a rotatable first cam follower, wherein the first cam follower is configured to contact the first sidewall along a first portion of the curved cam groove, and wherein the first cam follower is configured to generally not contact the second sidewall along the curved cam groove;
   a rotatable second cam follower, wherein the second cam follower is configured to contact the second sidewall along a second portion of the curved cam groove, and wherein the second cam follower is configured to generally not contact the first sidewall along the curved cam groove; and
   a shaft coupled to the first cam follower and the second cam follower, wherein the shaft is operable to perform a predetermined movement based on a movement of the first cam follower and the second cam follower with respect to the cam groove, and wherein the shaft is coupled to a block oriented about a circumference of a drum, wherein the block is further rotatably coupled to the drum, thereby defining a normal axis about which the block rotates.

2. The cam device of claim 1, wherein the drum is rotatably coupled to a frame, thereby defining a rotation axis, about which the drum is configured to rotate with respect to the frame.

3. The cam device of claim 1, wherein the first cam follower is rotatable about a first axis and the second cam follower is rotatable about a second axis, and wherein the first axis and the second axis are displaced by a predetermined amount from the normal axis, wherein the predetermined movement of the shaft with respect to the cam groove causes a rotation of the block about the normal axis.

4. The cam device of claim 1, wherein the block further comprises a plurality of suction nozzles.

5. The cam device of claim 1, wherein the drum further comprises a plurality of suction nozzles.

6. A turning apparatus employing a cam device, comprising:
   a surface of the cam device configured to define a curved cam groove, wherein the cam groove is generally defined by a first sidewall, an oppositely-disposed second sidewall, and a bottom wall;
   a rotatable first cam follower, wherein the first cam follower is configured to contact the first sidewall along a first portion of the curved cam groove, and wherein the first cam follower is configured to generally not contact the second sidewall along the curved cam groove;
   a rotatable second cam follower, wherein the second cam follower is configured to contact the second sidewall along a second portion of the curved cam groove, and wherein the second cam follower is configured to generally not contact the first sidewall along the curved cam groove;
   a shaft coupled to the first cam follower and the second cam follower, wherein the shaft is operable to perform a predetermined movement based on a movement of the first cam follower and the second cam follower with respect to the cam groove; and
   a block coupled to the shaft wherein the block is oriented about a circumference of a drum, and wherein the block is rotatably coupled to the drum, thereby defining a normal axis about which the block rotates.

7. The turning apparatus of claim 6, wherein surface of the cam device is cylindrical.

8. The turning apparatus of claim 6, wherein the first cam follower is rotatable about a first axis, and wherein the second cam follower is rotatable about a second axis.

9. The turning apparatus of claim 8, wherein the first axis and the second axis are the same axis.

10. The turning apparatus of claim 9, wherein the first sidewall comprises a first upper sidewall face and a first lower sidewall face, wherein the first upper sidewall face is displaced from the first lower sidewall face by a predetermined amount with respect to a centerline of the cam groove, and wherein the second sidewall comprises a second upper sidewall face and a second lower sidewall face, wherein the second upper sidewall face is displaced from the second lower sidewall face by the predetermined amount with respect to the centerline of the cam groove.

11. The turning apparatus of claim 10, wherein the first cam follower generally resides between the first upper sidewall face and the second upper sidewall face, and wherein the second cam follower generally resides between the first lower sidewall face and the second lower sidewall face.

12. The turning apparatus of claim 9, wherein one of the first cam follower or the second cam follower is rotationally fixed with respect to the shaft.

13. The turning apparatus claim 8, wherein the first axis and the second axis are displaced by a predetermined amount from the normal axis, wherein the predetermined movement of the shaft with respect to the cam groove causes a rotation of the block about the normal axis.

14. The turning apparatus of claim 6, wherein the drum is rotatably coupled to a frame, thereby defining a rotation axis, about which the drum is configured to rotate with respect to the frame.

15. The turning apparatus of claim 6, wherein the block further comprises a plurality of suction nozzles.

16. The turning apparatus of claim 6, wherein the drum further comprises a plurality of suction nozzles.

17. A cam device, comprising a cylindrical cam having an endless groove associated therewith, the groove defined by a first sidewall, an oppositely-disposed second sidewall, and a bottom wall, and individually rotatable first and second cam followers performing a predetermined movement along the groove;

wherein the first sidewall comprises a first upper sidewall face and a first lower sidewall face, wherein the first upper sidewall face protrudes toward a center of the groove, the second sidewall comprises a second upper sidewall face and a second lower sidewall face, wherein the second lower sidewall face protrudes toward the center of the groove, the rotatable first cam follower is in contact with the first upper sidewall face, the rotatable second cam follower is in contact with the second lower sidewall face, and the first and second cam followers are positioned coaxially with respect to one another.

18. The cam device according to claim 17, wherein a rotation direction of the first and second cam followers are opposite to each other.

19. The cam device according to claim 17, further comprising a shaft, wherein the shaft is coupled to the first cam follower and the second cam follower, wherein the shaft is operable to perform a predetermined movement based on a movement of the first cam follower and the second cam follower with respect to the cam groove, and wherein the shaft is coupled to a block oriented about a circumference of a drum.

20. The cam device according to claim 19, wherein the block rotates about a radial axis of the cylindrical cam.

21. The cam device according to claim 20, wherein rotation axes of the first and second cam followers are displaced by a predetermined amount from the radial axis, wherein the predetermined movement of the shaft with respect to the cam groove causes a rotation of the block about the radial axis.

22. The cam device according to claim 19, wherein the cam device changes circumferential velocity of the blocks to change a space between adjacent blocks.

23. The cam device according to claim 19, wherein the first cam follower or the second cam follower is rotationally fixed with respect to the shaft.

24. The cam device according to claim 19, wherein the block or the drum further comprises a plurality of suction nozzles.

* * * * *